US012046430B2

(12) United States Patent
Fruehling et al.

(10) Patent No.: US 12,046,430 B2
(45) Date of Patent: Jul. 23, 2024

(54) LIQUID METAL MEMS SWITCH

(71) Applicant: Texas Instruments Incorporated, Dallas, TX (US)

(72) Inventors: Adam Joseph Fruehling, Garland, TX (US); Dishit Paresh Parekh, Dallas, TX (US); Daniel Lee Revier, Dallas, TX (US); Benjamin Stassen Cook, Addison, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/213,296

(22) Filed: Jun. 23, 2023

(65) Prior Publication Data

US 2023/0335355 A1 Oct. 19, 2023

Related U.S. Application Data

(62) Division of application No. 16/234,243, filed on Dec. 27, 2018, now Pat. No. 11,728,111.

(51) Int. Cl.
*H01H 29/28* (2006.01)
*H01H 1/00* (2006.01)
*H01H 11/00* (2006.01)
*H01H 29/00* (2006.01)

(52) U.S. Cl.
CPC .......... *H01H 29/28* (2013.01); *H01H 1/0036* (2013.01); *H01H 11/00* (2013.01); *H01H 2029/008* (2013.01)

(58) Field of Classification Search
CPC ...... H01H 29/28; H01H 29/00; H01H 1/0036; H01H 11/00; H01H 2029/008
See application file for complete search history.

(56) References Cited

U.S. PATENT DOCUMENTS

| | | | | | |
|---|---|---|---|---|---|
| 6,781,074 | B1 | 8/2004 | Fong | | |
| 7,667,946 | B2 | 2/2010 | Choi | | |
| 2004/0201321 | A1* | 10/2004 | Wong | H01H 57/00 | 310/328 |
| 2005/0263379 | A1* | 12/2005 | Lindsey | H01H 29/04 | 200/182 |
| 2006/0124339 | A1 | 6/2006 | Goehlich | | |
| 2007/0089975 | A1* | 4/2007 | Beerling | H01H 29/06 | 200/182 |
| 2015/0129399 | A1* | 5/2015 | Feldman | H01H 29/00 | 200/235 |
| 2022/0013542 | A1* | 1/2022 | Wu | H01L 27/1203 | |

FOREIGN PATENT DOCUMENTS

| | | | | |
|---|---|---|---|---|
| EP | 3937242 | A1 * | 1/2022 | H01L 21/743 |
| JP | 2022014917 | A * | 1/2022 | H01L 21/743 |

* cited by examiner

*Primary Examiner* — Bayan Salone
(74) *Attorney, Agent, or Firm* — Ray A. King; Frank D. Cimino

(57) ABSTRACT

A switch that includes a droplet capable of spreading between two conductors to allow them to be coupled when a voltage is applied. The droplet can be enclosed by a cap that is bonded to a wafer that the droplet is placed upon, and include metallic properties. The cap can create a cavity that may be filled by a fluid, gas, or vapor. The cavity can have multiple conductors that extend partially or fully through it. The droplet can couple the conductors when specific voltages, or frequencies are applied to them. At the specific voltage and frequency, the droplet can spread, allowing at least two conductors to be coupled.

15 Claims, 10 Drawing Sheets

LIQUID METAL MEMS SWITCH

CROSS REFERENCE TO RELATED APPLICATION

This application is a division of U.S. patent application Ser. No. 16/234,243 filed Dec. 27, 2018, which is incorporated herein by reference.

BACKGROUND

Technical Field

This relates generally to microelectromechanical systems ("MEMS"), and more particularly to a device and method for a MEMS switch.

Description of Related Art

MEMS switches utilizing a bridge or beam structure have long failed to realize their performance potential owing primarily to fabrication difficulties and reliability concerns preventing their widespread adoption. Although many failure modes exist, they generally can be grouped into contact degradation failure and mechanical structure failure.

Some of these failures may include fractures, creep, stiction, electromigration, wear, degradation of dielectrics, delamination, contamination, or pitting of contacting surfaces, or electrostatic discharge. These failures are the result of traditional mechanical bridge and/or cantilever beam-like switches with solid conductors or dielectrics. The actuation of a mechanical bridge and/or cantilever beam over time generates wear on the components and ultimately triggers a failure of components.

BRIEF SUMMARY

This description is directed to a MEMS switch. The switch can include an encapsulant defining a cavity with a first electrical conductor extending at least partially into the cavity, and a second electrical conductor extending at least partially into the cavity. The cavity can also include at least one droplet that can have metallic properties within the cavity. A voltage source coupled to the first electrical conductor allowing the first electrical conductor and the second electrical conductor to be together by the droplet when a voltage from the voltage source is applied to the first electrical conductor, and the droplet spreads in a liquid manner upon application of the voltage.

Thus, in one aspect, this description is directed to a method of operation for a switch utilizing a liquid metal to couple multiple electrodes. The method can include applying a voltage to a first conductor of a device, and forcing a droplet to couple the first conductor to a second conductor of the device. The droplet can spread in a liquid manner after the application of the voltage causing the first conductor to be coupled with the second conductor. When the voltage is disconnected from the first conductor, the droplet can return to its original state.

In yet another aspect, this description is directed to a formation of a liquid metal MEMS switch. The switch can be created by depositing an oxide layer on a substrate, patterning a biasing structure on the oxide layer, growing the oxide layer through the biasing structure, planarizing the oxide layer to form a planarized surface, depositing a metal layer on the planarized surface, selectively depositing a dielectric layer on the metal layer to form a wafer, and dispensing a droplet on the wafer. The switch may also include a dielectric cap that is bonded to the wafer to enclose the droplet.

DETAILED DESCRIPTION

Figure 1A:
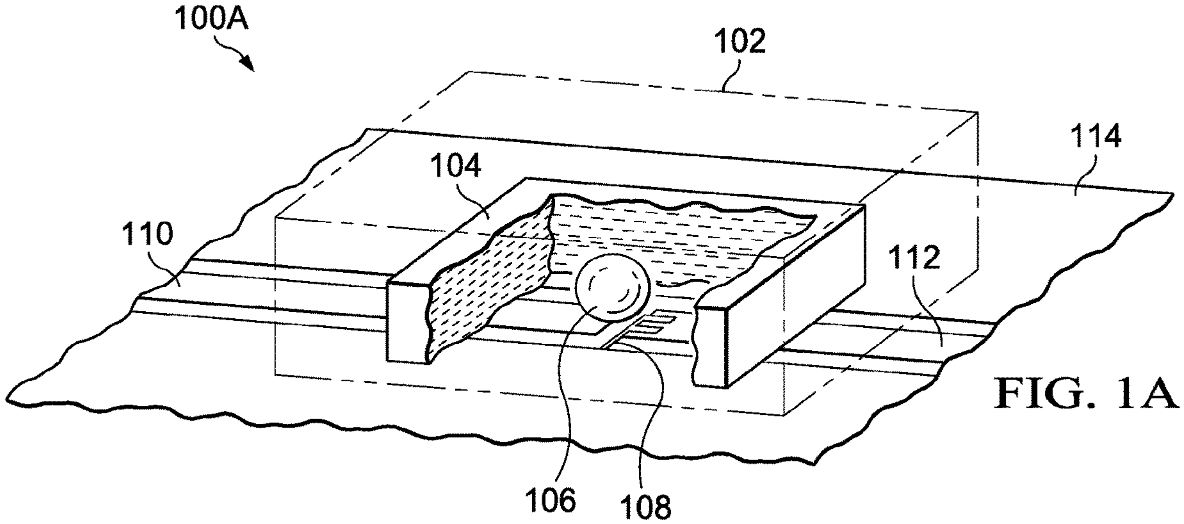
FIG. 1A is an illustration of a MEMS switching device in an off or unbiased state.

An embodiment will now be described. FIG. 1A is an illustration of a MEMS switching device 100A in an off or unbiased state. A MEMS switching device 100A includes in one version of this description, an encapsulant 102 that can be placed or constructed on a chip or chip area like that of an integrated circuit chip comprising semiconductor materials such as silicon, silicon germanium, gallium arsenide, polymers, ceramics or other semiconductor materials. The encapsulant 102 may also include a hermetic cap or dielectric cap. The encapsulant 102 defines a cavity 104 that contains a droplet 106. In alternative versions, the cavity 104 may also contain a biasing electrode 108. The biasing electrode 108 may have at least one electrode as determined by the number of conductors or droplets within the cavity 104. In at least one version, the droplet 106 is a liquid metal droplet.

The biasing electrode 108, in one example couples to a first conductor 110 and/or a second conductor 112. A voltage source (not shown) in another example may be coupled to the first conductor. In one version, a voltage source (not shown) may also be coupled to the output conduct directly or indirectly through various circuit components (not shown). In other versions, the voltage source (not shown) may also be coupled to a ground plane or substrate 114. In at least one version, the biasing electrode 108 can be coupled to the first or second conductor via an isolation circuit. The isolation circuit may include low pass filter(s), high pass filter(s), band pass filter(s), capacitors, and/or traces.

Figure 1B:
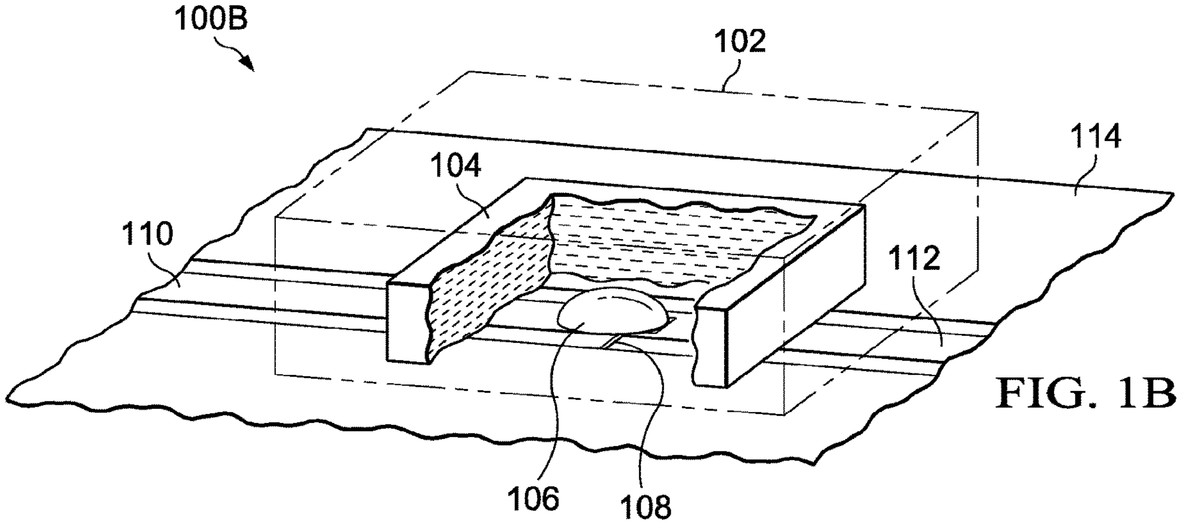
FIG. 1B is an illustration of a MEMS switching device in an on or biased state.

FIG. 1B is an illustration of a MEMS switching device 100B in an on or biased state. A MEMS switching device 100B includes in one version, an encapsulant 102 that can be placed or constructed on a chip or chip area like that of an integrated circuit chip comprising semiconductor materials such as silicon, silicon germanium, gallium arsenide, polymers, ceramics or other semiconductor materials. The MEMS switching device 100B, may be implemented in micro fluids, ceramics, printed circuit boards, flexible circuits, semiconductor(s), and/or substrates implementations.

The encapsulant 102 may also include a hermetic cap or dielectric cap. The encapsulant 102 defines a cavity 104 that contains a droplet 106. In alternative versions, the cavity 104 may also contain a biasing electrode 108. The biasing electrode 108 may have at least one electrode as determined by the number of conductors and droplets within the cavity 104.

In one version, the biasing electrode 108 couples to a first conductor 110. In alternative versions, the biasing electrode 108 couples to a second conductor 112. A voltage source (not shown) may be coupled to the first conductor. In one version, the voltage source (not shown) may also couple to the output conduct through various circuit components (not shown). In other versions, the voltage source (not shown) may also couple to a ground plane or substrate 114. A first conductor 110 couples to a second conductor 112 through the droplet 106 when a voltage is applied to the first conductor 110. In other versions, the first conductor 110 couples to a second conductor 112 through the droplet 106 and the biasing electrode 108. The voltage transfers to the droplet 106, allowing the droplet 106 to spread in a liquid manner and couple the first conductor 110 to the second conductor 112. In at least one version, the droplet 106 spreads due to the breakdown of the oxide skin on the surface of the droplet 106 and reduces the surface tension allowing the droplet 106 to couple the conductors 110/112. In other examples, the voltage transfers to the droplet 106 via the biasing electrode 108, allowing the droplet 106 to spread in a liquid manner and couple the first conductor 110 to the second conductor 112. In at least one version, as a voltage is applied to the biasing electrode 108, and/or the first or second conductor 110/112, the electrical field within the cavity can change causing the contact angle of the droplet to change and allow for a coupling of the conductor (s) 110/112.

Figure 2:
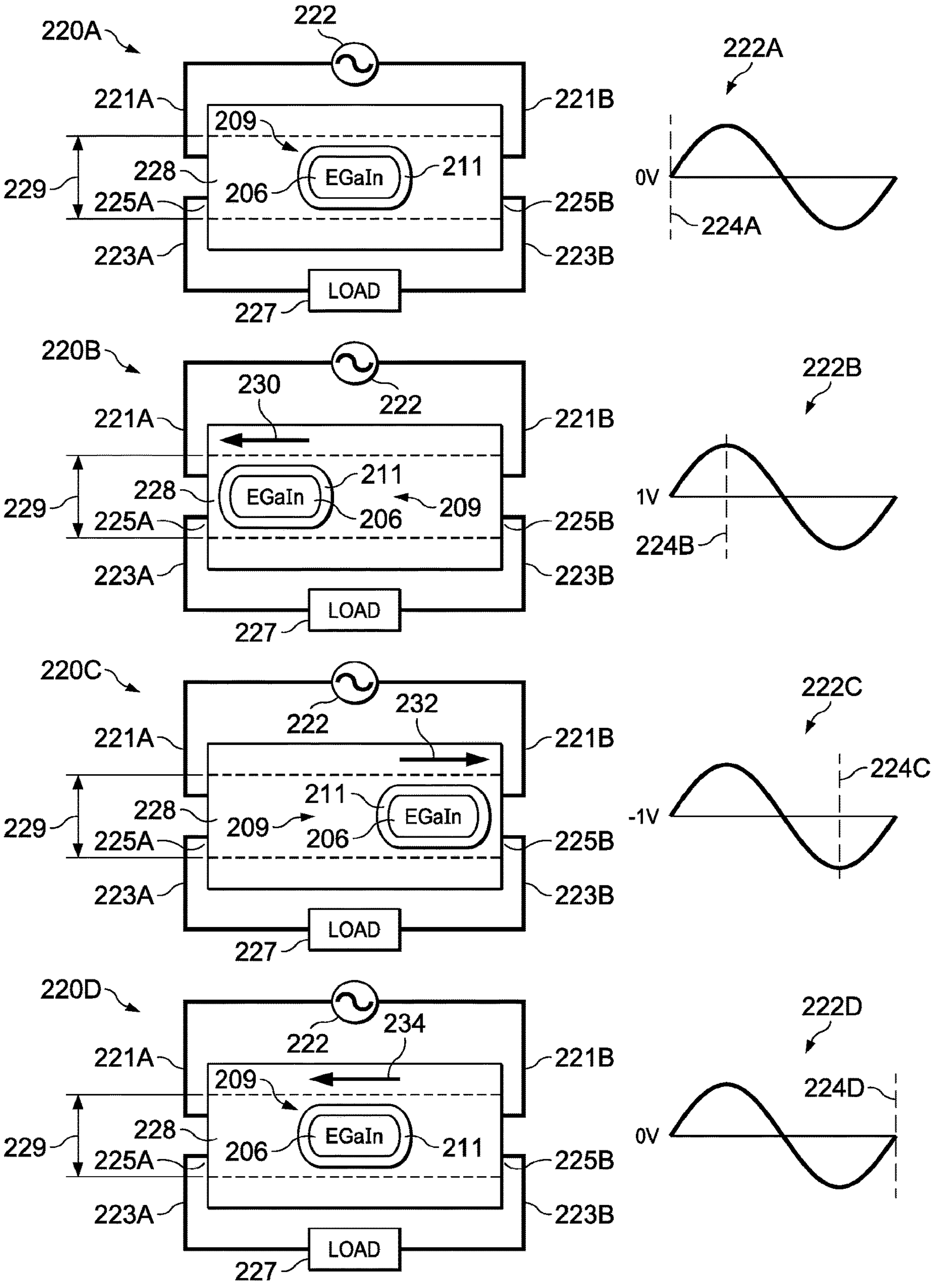
FIG. 2 is an illustration of a droplet movement based on a voltage source.

FIG. 2 is an illustration of a droplet 206 movement based on a voltage source 222. In at least one version, the droplet 206 may be a droplet or a plug both of which, can be formed from liquid metal. The droplet 206 may also include an oxide skin 211 that can prevent surface adhesion, stiction, and/or wear on the electrodes and/or conductors from occurring. A slip layer 209 may be created between a tube 229 and the droplet 206.

An unbiased circuit 220A is created when a voltage source 222 couples to a tube 229. In one version, the tube 229 is filled with a fluid 228, such as a dielectric and/or electrolyte fluid. The fluid in one version may be a dielectric fluid, such as but not limited to, mineral oil, glycerol, n-hexane, n-heptane, castor oil, silicone oil, polychlorinated biphenyls, purified water, benzene, liquid oxygen, liquid nitrogen, liquid hydrogen, liquid helium, or liquid argon. In alternative versions, the fluid is a mixture of a dielectric fluid and sodium hydroxide or hydrogen chloride or other hydrogen halide to bring the pH>10 (basic) or <3 (acidic) and hence dissolve the oxide skin on the gallium-based liquid metal droplet. In at least one example, the dielectric and/or electrolyte fluid is a salt solution such as, sodium chloride (NaCl) or sodium fluoride (NaF).

A first input conductor 221A, or a second input conductor 221B, can be coupled by a droplet 206 to a first output conductor 223A, or a second output conductor 223B respectively. In alternative versions, the conductors 221A, 221B, 223A, and/or 223B are coupled to a droplet 206 by a biasing electrode 225A, and/or a biasing electrode 225B. The droplet 206 moves based on the voltage applied to the conductors 221A, 221B, 223A, and/or 223B by the voltage source 222. For example, in one version, the droplet 206 will move based on the voltage level of the voltage source 222, while in other versions the frequency of an oscillating voltage from the voltage source 222 may cause the movement of the droplet 206.

In one version, the biasing electrode(s) 225A, and/or 225B couple to the input conductors 221A, and/or 221B respectively. In alternative versions, the biasing electrodes 225A, and/or 225B couple to the output conductors 223A, and/or 223B respectively. A load 227 couples to the voltage source 222 through the conductors 221A, 221B, 223A, and/or 223B, the biasing electrodes 225A, and/or 225B, and the droplet 206. For example, the biasing electrode 225A couples to the voltage source 222 through the input conductor 221A, when the droplet 206 is attracted to the biasing electrode 225A and then couples with the biasing electrode 225A, a coupling can occur with the output conductor 223A. Alternatively, the biasing electrode 225B couples to the voltage source 222 through the input conductor 221B, when the droplet 206 is attracted to the biasing electrode 225B and then couples with the biasing electrode 225B, a coupling can occur with the output conductor 223B.

A voltage waveform 222A is the output of the voltage source 222 for the unbiased circuit 220A. The voltage source output 224A is at a zero (0) voltage for the unbiased circuit 220A. When the voltage source output 224A is at a zero (0) voltage or no voltage state the droplet 206 can be in a free floating position and allowing the load 227 to be disconnected from the voltage source 222. In at least one version, the free floating position can be when the droplet is held in place by a surface tension and against the biasing electrode 225A or 225B. In some versions, the droplet 206 is attracted to but not coupled to the biasing electrode 225A or 225B.

A positively biased circuit 220B illustrates the movement of a droplet 206 when a voltage waveform 222B has a voltage source output 224B of a positive voltage such as but not limited to 1V, 3.3V, 5V, 12V, 24V 48V, 120V and/or 240V Alternating Current (AC) or Direct Current (DC) voltages. The positive voltage at the voltage source output 224B provides an attractive force 230 that pulls the droplet 206 to one side of the tube 229. In some versions, the attractive force 230 may overcome a surface tension that hinders the movement of the droplet 206. Coupling the voltage source 222, to the load 227 through the first input conductor 221A, the droplet 206, the first output conductor 223A and/or a biasing electrode 225A.

A negatively biased circuit 220C illustrates the movement of a droplet 206 when a voltage waveform 222C has a voltage source output 224C of a negative voltage such as but not limited to −1V, −3.3V, −5V, −12V, −24V −48V, −120V and/or −240V Alternating Current (AC) or Direct Current (DC) voltages. A repulsion force 232 (may also be considered as a negative attractive force) can be triggered by the negative voltage at the voltage source output 224C. The repulsion force 232 causes the droplet 206 to shift to the opposite side of the tube 229 as in the positively biased circuit 220B. In some versions, the repulsion force 232 may overcome a surface tension that hinders the movement of the droplet 206. The shift creates a coupling of the voltage source 222, to the load 227 through the second input conductor 221B, the droplet 206, the second output conductor 223B, and/or a biasing electrode 225B.

An unbiased circuit 220D illustrates the movement of a droplet 206 when a voltage waveform 222D returns to a voltage source output 224C of zero (0) volts. With no voltage on any of the conductors 221A, 221B, 223A, 223B, and/or biasing electrodes 225A and/or 225B, then there is no attractive or repulsion force being applied to the droplet 206. This can result in an equilibrium force or movement 234, allowing the droplet to settle in its free floating position again, just as it is in the unbiased circuit 220A. The voltage source output 224 can be any level or voltage to drive the droplet 206. Usually, the higher the voltage the faster the movement of the droplet 206. While voltages less than or equal to five voltage will provide the movement desired, other voltages can also be utilized. The voltage waveform 222 has been represented as a sinusoidal waveform, but other waveform shapes or profiles may also be utilized such as, but not limited to square waves, saw waves, and other waveforms.

Figure 3A:
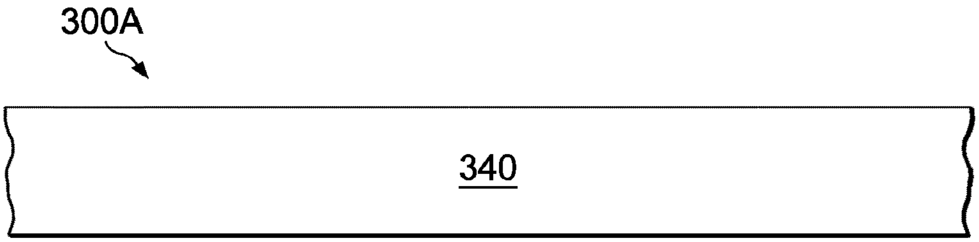
FIG. 3A is an illustration of a wafer during initial formation.

FIG. 3A is an illustration of an initial wafer formation step 300A. To begin formation, a substrate 340 is formed, grown, and/or manufactured from a material such as, but not limited to silicon, silicon dioxide, aluminum oxide, sapphire, germanium, gallium arsenide, an alloy of silicon and germanium or indium phosphide. In at least one version, the substrate 340 is formed, grown, and/or manufactured utilizing silicon or glass, or combinations thereof.

Figure 3B:
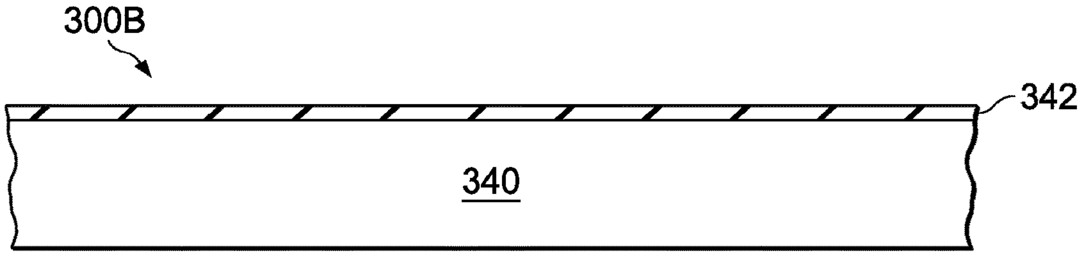
FIG. 3B is an illustration of an intermediary wafer formation step.

FIG. 3B is an illustration of an intermediary wafer formation step 300B. An oxide layer 342 is grown upon the substrate 340. The oxide layer 342 is formed and/or grown from by a thermal oxidation process that triggers an oxidation of the substrate material at a specific temperature. In alternative versions, the oxide material is grown, deposited, or bonded onto the substrate 340 to create the oxide layer 342. The temperature can range between 900 degrees and 1100 Celsius. In some versions, the oxide layer 342 may also be patterned utilizing methods such as but not limited to masking, doping, imprint transfer, printing, and/or photolithography.

Figure 3C:
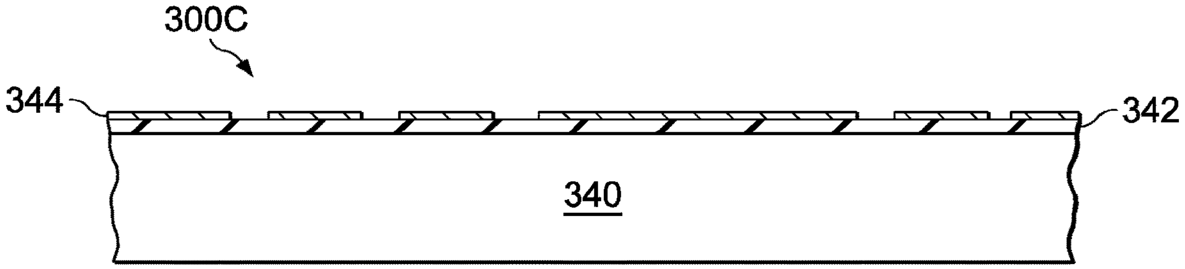
FIG. 3C is an illustration of an intermediary wafer formation step.

FIG. 3C is an illustration of an intermediary wafer formation step 300C. A biasing structure 344 is deposited on the oxide layer 342. The deposition can be performed through a patterning, masking, doping, and/or photolithography process. The biasing structure 344 may be a conductive material such as, but not limited to, metal, glass, rubber, plastic, other synthetic materials, and/or dielectric. The biasing structure can in alternative versions be deposited and/or patterned on the substrate 340.

Figure 3D:
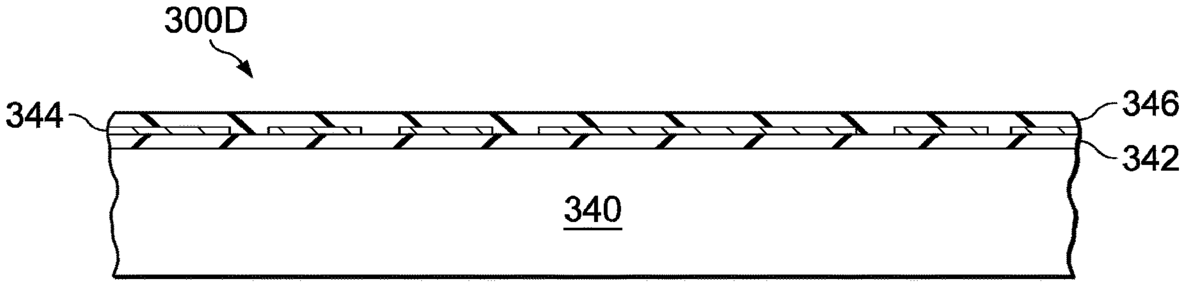
FIG. 3D is an illustration of an intermediary wafer formation step.

FIG. 3D is an illustration of an intermediary wafer formation step 300D. An oxide layer 346 can be deposited upon the biasing structure 344, or in alternative versions the oxide layer 342 can be grown through a patterned biasing structure 344 from the substrate 340. The oxide layer 346 is then planarized to create a smooth or flat surface for the next layer. A planarization can be performed for each step to create a smooth or flat surface for the next layer to be patterned, deposited or grown upon.

Figure 3E:
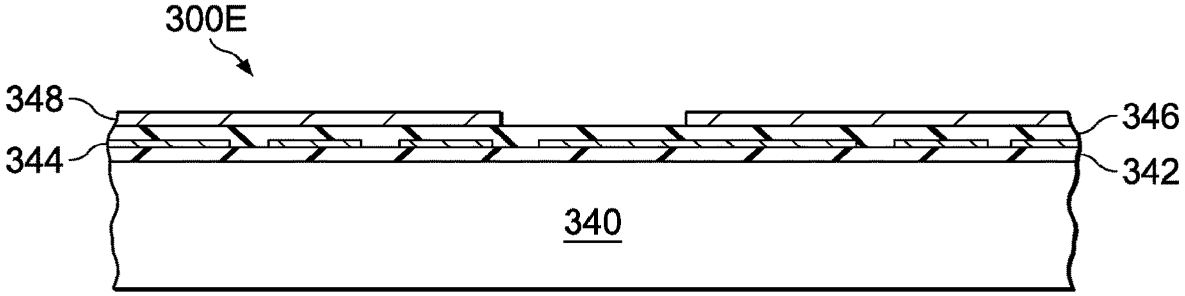
FIG. 3E is an illustration of an intermediary wafer formation step.

FIG. 3E is an illustration of an intermediary wafer formation step 300E. A metal layer 348 is deposited upon the oxide layer 346. The metal layer 348 can be patterned through masking, doping, and/or photolithography processes to create the specific metal structure desired for the metal layer 348. In one version of this description, the metal layer 348 is a conductor, and/or electrode that is utilized to couple with another conductor and/or electrode within the cavity (not shown) of the switching device. In alternative versions, the metal layer 348 may be deposited or patterned on the biasing structure 344, the oxide layer 342, and/or the substrate 340 to create additional conductors or electrodes. The metal layer 348 can create conductors that partially extend into a cavity (not illustrated).

Figure 3F:
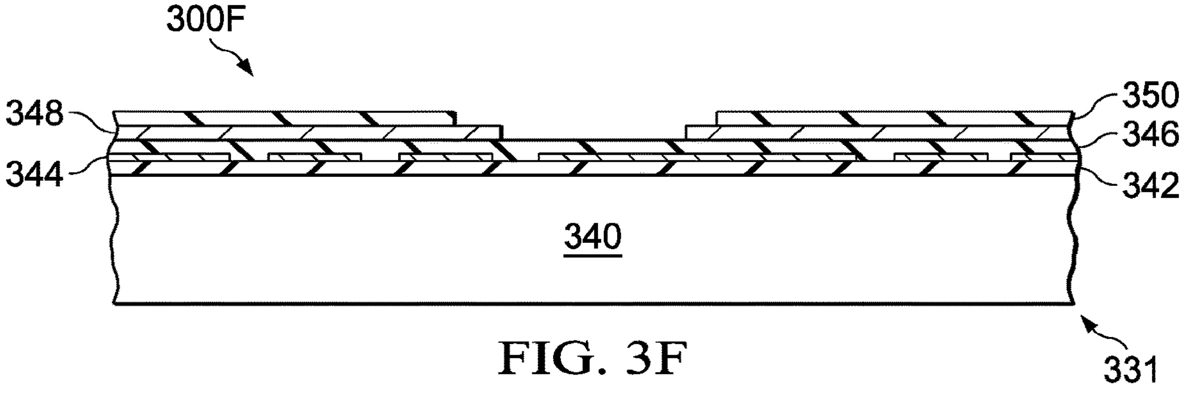
FIG. 3F is an illustration of a wafer at the conclusion of formation.

FIG. 3F is an illustration of a wafer 331 at the conclusion of formation 300F. The wafer 331 is completed with the depositing, and/or patterning of a dielectric layer 350. The dielectric layer may also be planarized to create a smooth and/or flat surface. The dielectric layer 350 may also be deposited and/or patterned on the substrate 340, the oxide layer 342, the biasing structure 344, the oxide layer 346, and/or the metal layer 348.

Figure 4A:
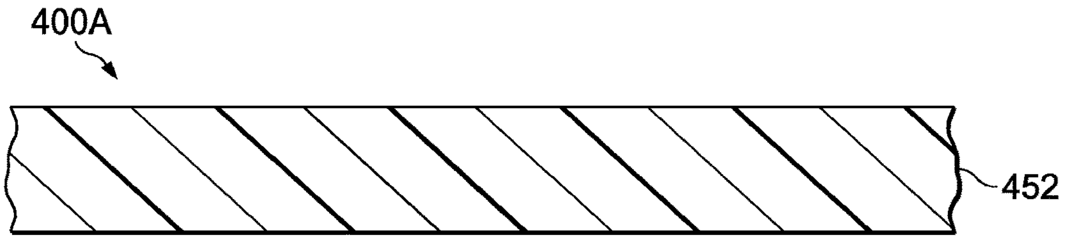
FIG. 4A is an illustration of an encapsulant or cap during initial formation.

FIG. 4A is an illustration of an encapsulant or cap during an initial formation step 400A. A frame 452 is utilized during the formation and/or manufacture of an encapsulant or cap. The frame may be a metal, plastic, rubber, or other material such as but not limited to, silicon, silicon dioxide, aluminum oxide, sapphire, germanium, gallium arsenide, an alloy of silicon and germanium or indium phosphide.

Figure 4B:
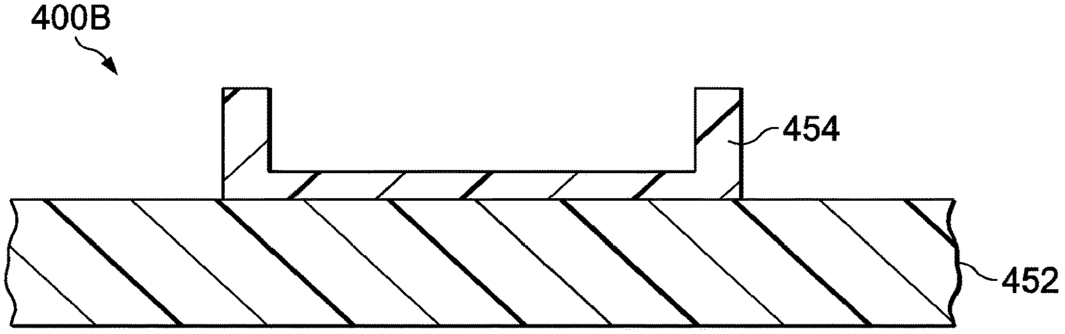
FIG. 4B is an illustration of an intermediary encapsulant or cap formation step.

FIG. 4B is an illustration of an intermediary encapsulant or cap formation step 400B. An encapsulant or cap 454 is formed, and/or manufactured on top of the frame 452. In one version, the encapsulant or cap 454 is printed on top of the frame 452, utilizing a 3D printer, or other additive manufacturing processes. In alternative versions, the encapsulant or cap 454 is formed from metal, plastic, rubber, or other material such as but not limited to, silicon, silicon dioxide, aluminum oxide, sapphire, germanium, gallium arsenide, an alloy of silicon and germanium or indium phosphide.

Figure 4C:
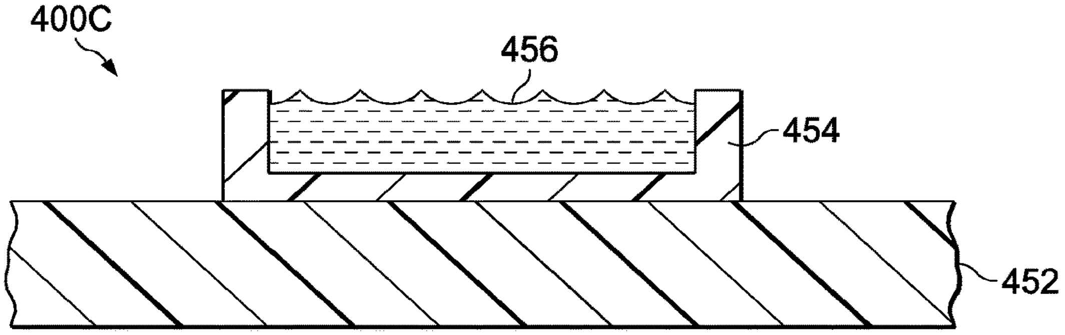
FIG. 4C is an illustration of an intermediary encapsulant or cap formation step.

FIG. 4C is an illustration of an intermediary encapsulant or cap formation step 400C. The encapsulant or cap 454 is filled with a fluid 456. The fluid in one version may be a dielectric fluid, such as but not limited to, mineral oil, glycerol, n-hexane, n-heptane, castor oil, silicone oil, polychlorinated biphenyls, purified water, benzene, liquid oxygen, liquid nitrogen, liquid hydrogen, liquid helium, or liquid argon. In alternative versions, the fluid is a mixture of a dielectric fluid and sodium hydroxide or hydrogen chloride or other hydrogen halide to bring the pH>10 (basic) or <3 (acidic) and hence dissolve the oxide skin on the gallium-based liquid metal droplet.

Figure 4D:
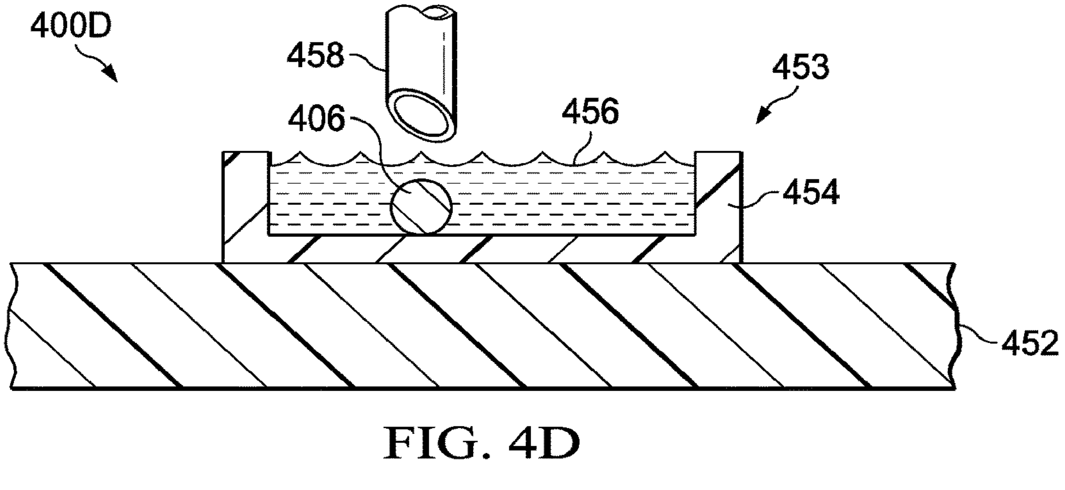
FIG. 4D is an illustration of an encapsulant or cap at the conclusion of formation.

FIG. 4D is an illustration of an encapsulant or cap structure 453 at the conclusion of formation 400D. The encapsulant or cap 454 contains a fluid 456, and a droplet 406. The droplet 406 is placed within the encapsulant or cap 454 by a droplet delivery device 458. The droplet delivery device 458 in one version is a syringe. However, in alternative versions, the droplet delivery device 458 can be a dropper, micro-pipette, or other method of delivering a liquid metal drop, such as a spoon, bowl, or ladle within the encapsulant or cap 454. In at least one version, the droplet delivery device is calibrated.

Figure 5A:
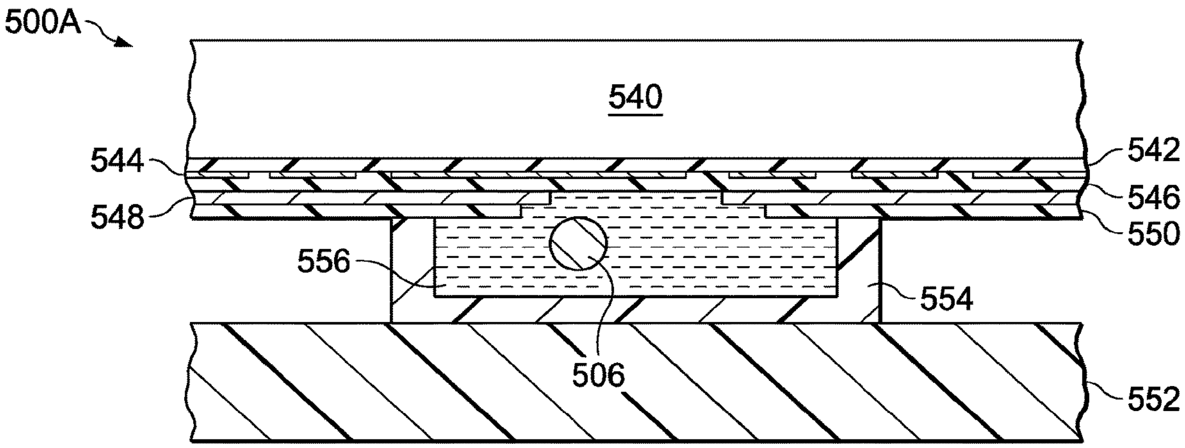
FIG. 5A is an illustration of a MEMS switching device during initial formation.

FIG. 5A is an illustration of a MEMS switching device during an initial formation step 500A. A wafer and an encapsulant or cap is combined to from a MEMS switching device. The wafer includes a substrate 540, an oxide layer 542, a biasing structure 544, an oxide layer 546, a metal layer 548, and/or a dielectric layer 550. The encapsulant or cap includes a cap 554, a fluid 556, and/or a droplet 506, supported by a frame 552. The wafer can be placed upon the encapsulant or cap. In one version, the wafer and the encapsulant or cap can be affixed together utilizing a eutectic bond, adhesive, glue, or other fastener.

Figure 5B:
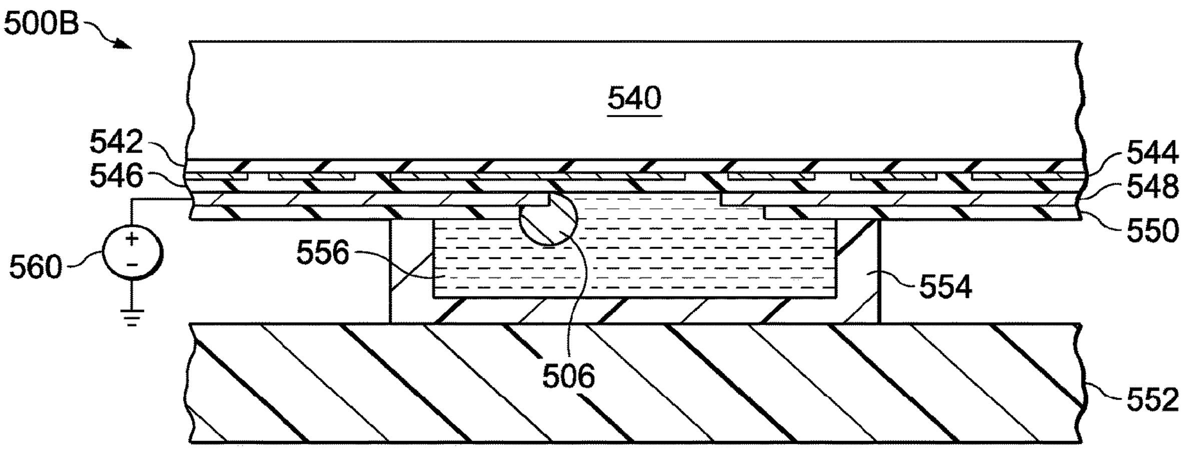
FIG. 5B is an illustration of an intermediary MEMS switching device formation step.

FIG. 5B is an illustration of an intermediary MEMS switching device formation step 500B. The wafer includes a substrate 540, an oxide layer 542, a biasing structure 544, an oxide layer 546, a metal layer 548, and/or a dielectric layer 550. The encapsulant or cap includes a cap 554, a fluid 556, and/or a droplet 506, supported by a frame 552. The droplet 506 is biased by a voltage source 560 to a first side or a second side of the metal layer 548 for using in switching applications. The attractive force of the voltage source 560 triggers the biasing. In alternative versions, a repulsive force may be utilized to force the droplet 506 away from the first side, or the second side of the metal layer 548.

Figure 5C:
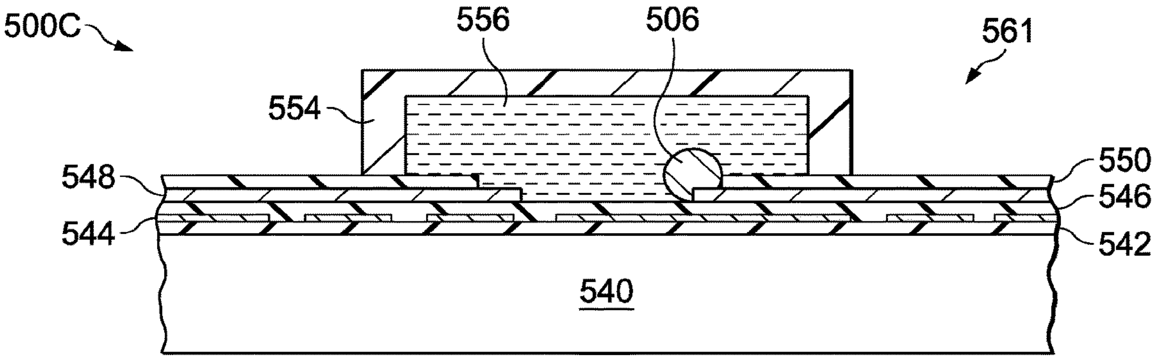
FIG. 5C is an illustration of a MEMS switching device at the conclusion of formation.

FIG. 5C is an illustration of a MEMS switching device 561 at the conclusion of formation 500C. The MEMS switching device 561 is completed when the wafer and the encapsulant or cap combination is removed from the frame 552. The wafer includes a substrate 540, an oxide layer 542, a biasing structure 544, an oxide layer 546, a metal layer 548, and/or a dielectric layer 550. The encapsulant or cap includes a cap 554, a fluid 556, and/or a droplet 506, supported by a frame 552.

After completion the MEMS switching device 561 may be utilized in any number of circuits or circuit combinations. When a voltage is applied to at least one side of the metal layer 548, the droplet 506 is spread in a liquid manner and/or melted to connect at least two sides of the metal layer 548. However, in alternative versions the droplet 506 may move between the first side and the second side coupling multiple sections of the metal layer 548 that can correspond to additional conductors and/or electrodes.

Figure 6A:
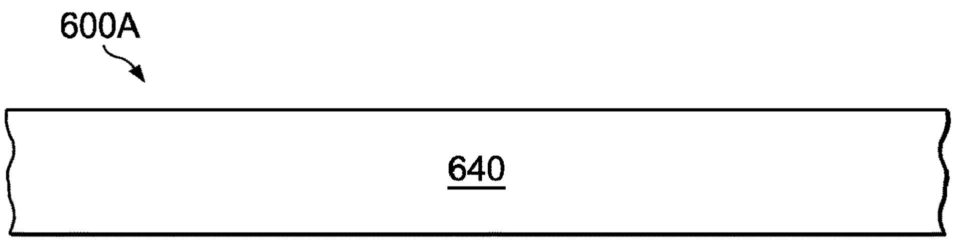
FIG. 6A is an illustration of a MEMS switching device during initial formation.

FIG. 6A is an illustration of a MEMS switching device during an initial formation step 600A. To begin formation, a substrate 640 is formed, grown, and/or manufactured from a material such as, but not limited to silicon, silicon dioxide, aluminum oxide, sapphire, germanium, gallium arsenide, an alloy of silicon and germanium or indium phosphide. In one version, the substrate 640 is planarized to create a flat or smooth surface for forming, growing, and/or manufacturing additional portions of a MEMS switching device.

Figure 6B:
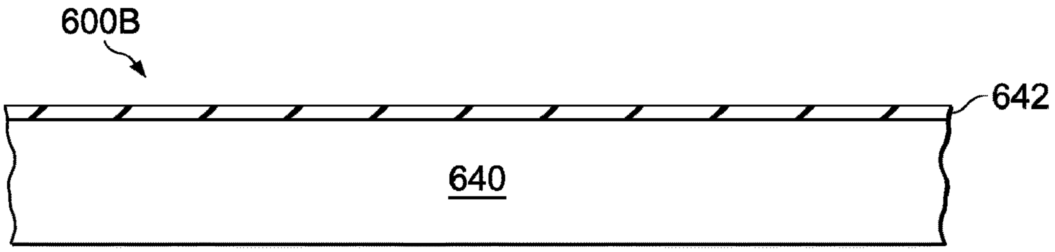
FIG. 6B is an illustration of an intermediary MEMS switching device formation step.

FIG. 6B is an illustration of an intermediary MEMS switching device formation step 600B. An oxide layer 642 is grown upon the substrate 640 to create a first oxide layer. The oxide layer 642 is formed and/or grown from by a thermal oxidation process that triggers an oxidation of the substrate material at a specific temperature. The temperature can range between 900 degrees and 1100 degrees Celsius. In alternative versions, the oxide material is deposited on the substrate 640 to create the oxide layer 642. During deposition the temperature can be lower than the oxide formation and/or growth, using processes such as, plasma-enhanced chemical vapor deposition (PECVD), or sputtering. In some versions the oxide layer 642 may also be patterned utilizing methods such as but not limited to masking, doping, imprint transfer, printing, and/or photolithography.

Figure 6C:
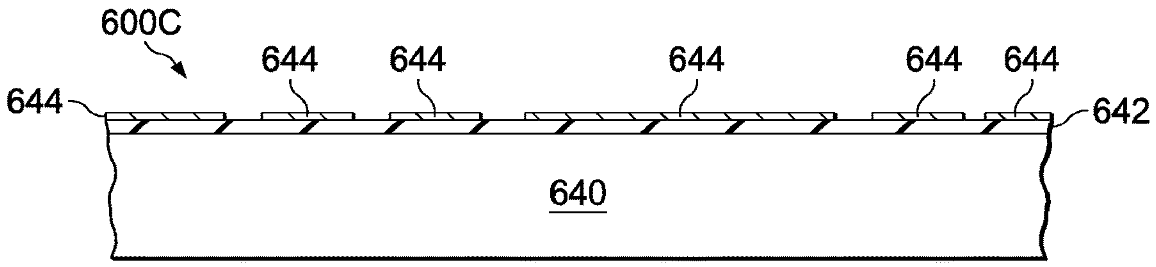
FIG. 6C is an illustration of an intermediary MEMS switching device formation step.

FIG. 6C is an illustration of an intermediary MEMS switching device formation step 600C. A biasing structure 644 is deposited on top of the oxide layer 642. The deposition can be performed through a patterning, masking, doping, and/or photolithography process. The biasing structure 644 may be a resistive or insulating material such as, but not limited to, glass, rubber, plastic, other synthetic materials, and/or dielectric. The biasing structure can in alternative versions be deposited and/or patterned on the substrate 640.

Figure 6D:
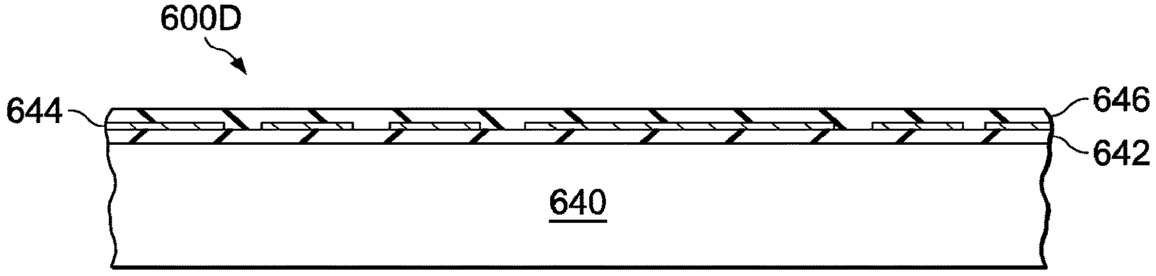
FIG. 6D is an illustration of an intermediary MEMS switching device formation step.

FIG. 6D is an illustration of an intermediary MEMS switching device formation step 600D. An oxide layer 646 can be deposited upon the biasing structure 644, or in alternative versions, the oxide layer 642 can be grown through a patterned biasing structure 644 from the substrate 640. The oxide layer 646 is then planarized to create a smooth or flat surface for the next layer. A planarization can be performed for each step to create a smooth or flat surface for the next layer to be deposited or grown upon.

Figure 6E:
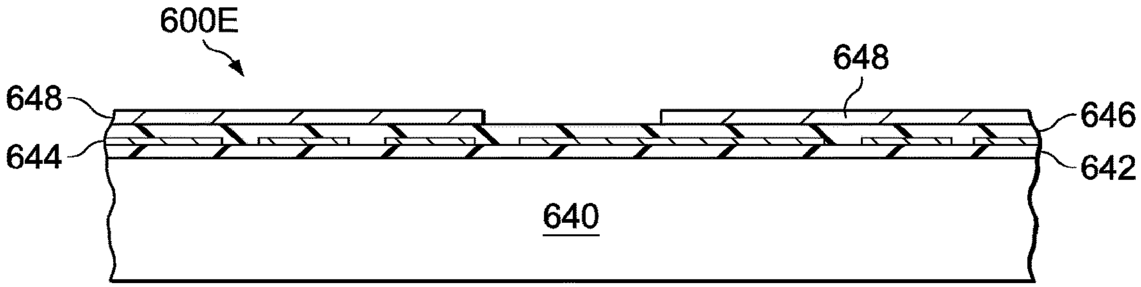
FIG. 6E is an illustration of an intermediary MEMS switching device formation step.

FIG. 6E is an illustration of an intermediary MEMS switching device formation step 600E. A metal layer 648 is deposited upon the oxide layer 646. The metal layer 648 can be patterned through masking, doping, and/or photolithography processes to create the specific metal structure desired for the metal layer 648. In one version of this description, the metal layer 648 is a conductor, and/or electrode that is utilized to couple with another conductor and/or electrode within the cavity (not shown) of the switching device. In alternative versions, the metal layer 648 may be deposited or patterned on the biasing structure 644, the oxide layer 642, and/or the substrate 640.

Figure 6F:
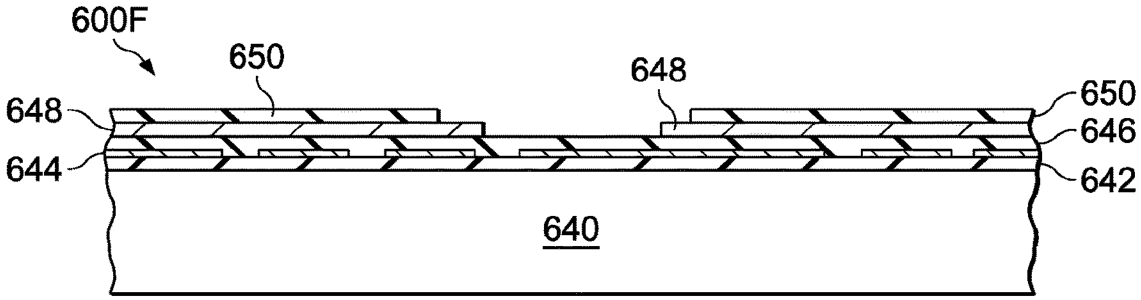
FIG. 6F is an illustration of an intermediary MEMS switching device formation step.

FIG. 6F is an illustration of an intermediary MEMS switching device formation step 600F. The wafer 331 is completed with the selective depositing, and/or patterning of a dielectric layer 650. The dielectric layer may also be planarized to create a smooth and/or flat surface. The dielectric layer 650 may also be deposited and/or patterned on the substrate 640, the oxide layer 642, the biasing structure 644, the oxide layer 646, and/or the metal layer 648.

Figure 6G:
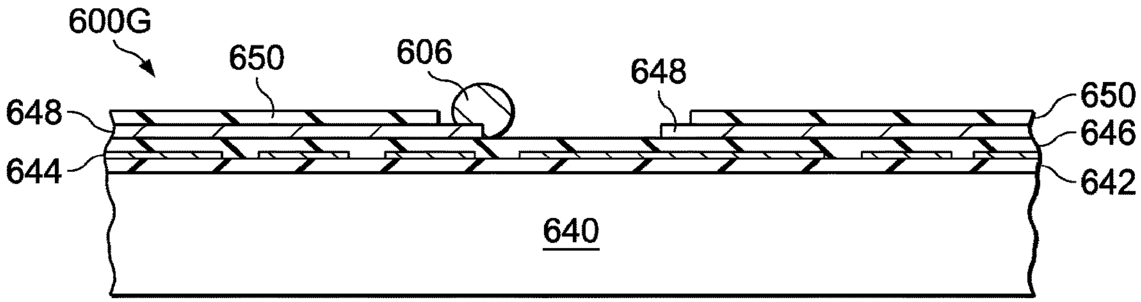
FIG. 6G is an illustration of an intermediary MEMS switching device formation step.

FIG. 6G is an illustration of an intermediary MEMS switching device formation step 600G. A droplet 606 may be placed on the combination of the substrate 640, the oxide layer 642, the biasing structure 644, the oxide layer 646, the metal layer 648, and/or the dielectric layer 650. The droplet 606 is placed upon the wafer by a droplet delivery device (not illustrated). The droplet delivery device in one version is a syringe. However, in alternative versions, the droplet delivery device can be a dropper, micro-pipette, inkjet, printer, or other method of delivering a liquid metal drop, such as a spoon, bowl, or ladle. In at least one version, the droplet delivery device is calibrated. The calibration assists in maintaining a desired droplet size to ensure the repeatability and reliability of the MEMS switching device.

Figure 6H:
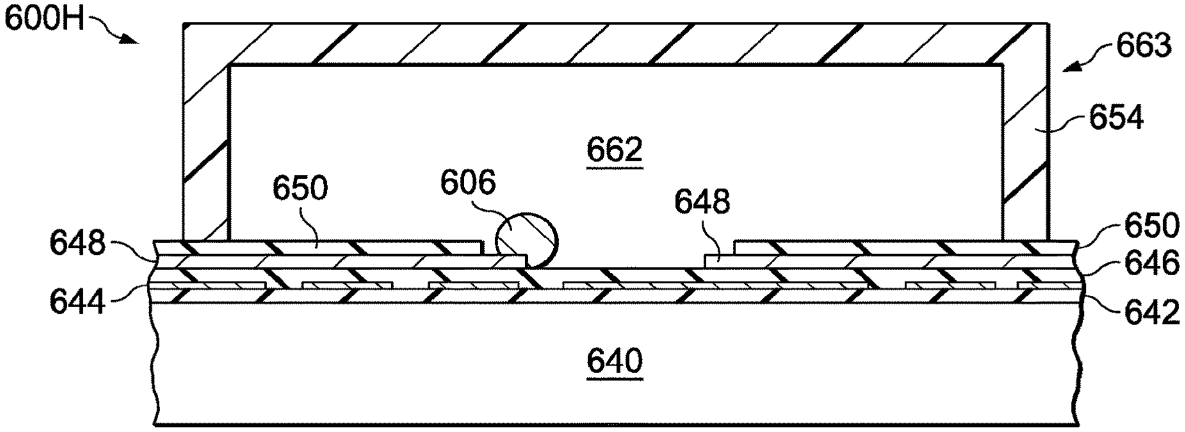
FIG. 6H is an illustration of a MEMS switching device at the conclusion of formation.

FIG. 6H is an illustration of a MEMS switching device 663 at the conclusion of formation 600H. An encapsulant or cap 654 can be placed upon and/or affixed to the wafer. In one version of this description, the wafer and the encapsulant or cap 654 can be affixed together utilizing an adhesive, glue, or other fastener.

The encapsulant or cap 654 defines a cavity 662 that is utilized to protect and enclose the wafer (exposed sections of the wafer), and/or the droplet 606. The cavity 662 in one version is filled by a vacuum. In alternative versions, the cavity 662 may be filled with a vapor or gas such as, but not limited to, hydrochloric acid, oxygen, nitrogen, hydrogen, helium, argon, n-hexane, n-heptane, or benzene. In some versions, the cavity 662 may be under pressure or heated to a sufficient temperature to allow a fluid to become a vapor or gas. In some examples, the droplet 606 is encapsulated in a gas environment in a hermetic package, the vapor pressure can be reduced to ensure the headspace does not experience condensation across operating temperature ranges. This can be advantageous in high power systems to reducing the possibility of arcing.

The exposed sections of the wafer may include, the dielectric layer 650, the metal layer 648, the oxide layer 646, and/or one of the biasing structure 644, the oxide layer 642, and the substrate 640.

Figure 7A:
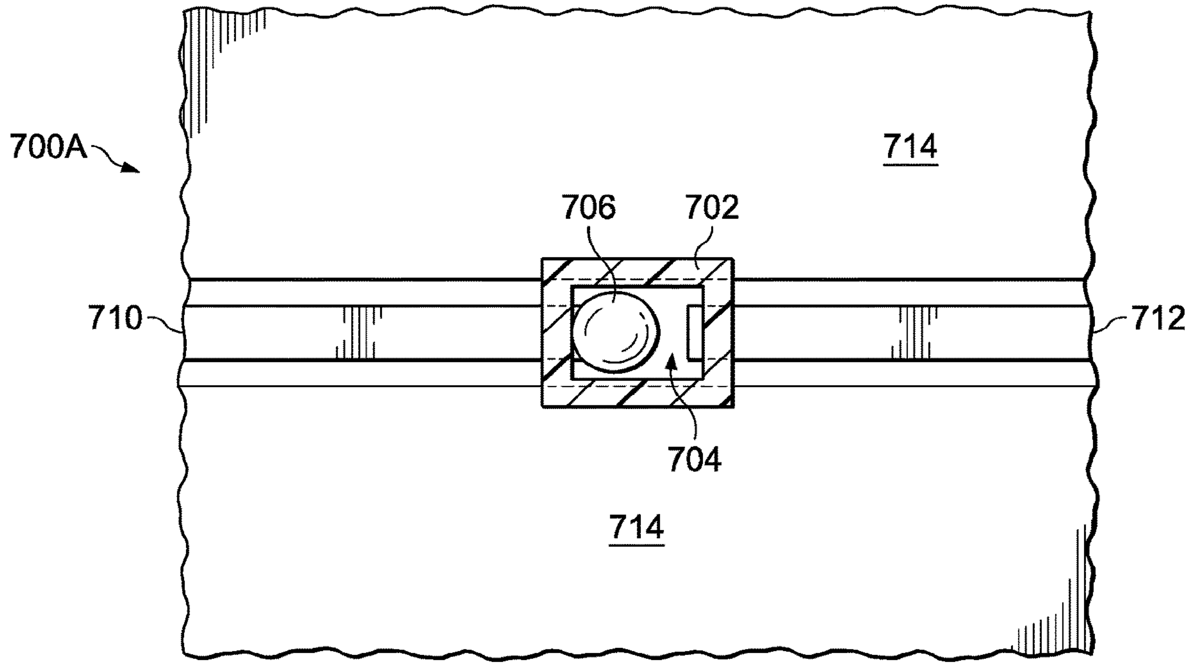
FIG. 7A is an illustration of an operational configuration of a MEMS switching device.

FIG. 7A is an illustration of an operational configuration of a series MEMS switching device 700A. A droplet 706 comprised of liquid metal, or metallic properties is placed within a cavity 704 defined by an encapsulant or cap 702. In one version, the encapsulant or cap 702 is filled with a fluid, vapor, or gas, such as mineral oil, n-hexane, n-heptane, castor oil, glycerol, silicone oil, polychlorinated biphenyls, purified water, benzene, liquid oxygen, liquid nitrogen, liquid hydrogen, liquid helium, liquid argon, or hydrochloric acid, oxygen, nitrogen, hydrogen, helium, argon, benzene, or benzene vapor.

An input electrode 710 partially extends within the cavity 704 and can be coupled by the droplet 706 to an output electrode 712 that also partially extends within the cavity 704. The input electrode 710, and/or the output electrode 712 can be a metal or metallic layer of a wafer or other semiconductor device. The coupling of the input electrode 710 and the output electrode 712 occurs in a series configuration when a voltage (not illustrated) applied to the input electrode 710 causes the droplet 706 to spread in a liquid manner and/or melt allowing the input electrode 710 to couple with the output electrode 712. The first conductor 710, the second conductor 712, and/or the voltage can be coupled to a ground or substrate 714.

Figure 7B:
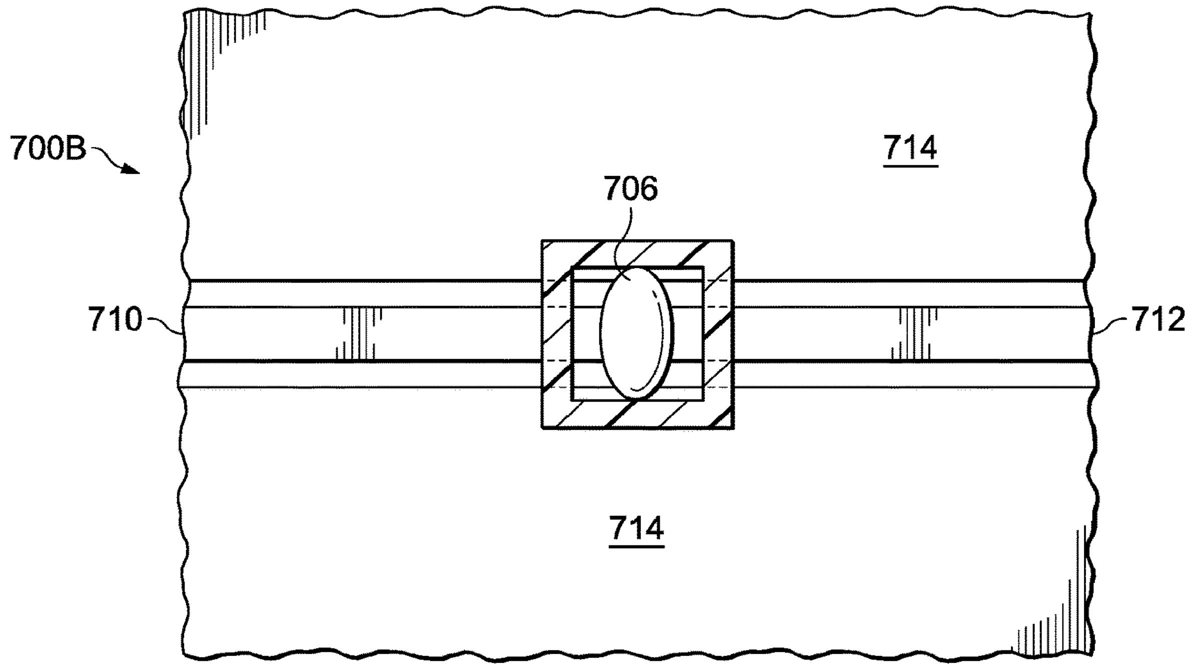
FIG. 7B is an illustration of an operational configuration of a MEMS switching device.

FIG. 7B is an illustration of an operational configuration of a shunt MEMS switching device 700B. In a shunt MEMS switching device 700B, a droplet 706 couples an input electrode 710, and/or an output electrode 712 to a ground or substrate 714. The droplet 706 is formed from metallic elements such as but not limited to, gallium, indium, tin, bismuth, or other similar element, alloys, or compositions. In at least one version, the droplet 706 is formed of a eutectic alloy of gallium and indium (EGaIn) with a melting point of 15.5° C. Some other versions may include gallium with a melting point of 30° C., a eutectic allow of gallium, indium, and tin (EGaInSn) with a melting point of −19° C., and/or a eutectic allow of bismuth, indium, and tin with a melting point of 62° C. In some versions, package and/or substrate heaters can be included to maintain the droplet 706 in the proper state across the operating temperature ranges. The shunt MEMS switching device 700B can be advantageously utilized in circuit protection, or load protection systems.

For example, the shunt MEMS switching device 700B can be utilized as a fuse or surge protector by spreading in a liquid manner and/or melting when a voltage, current, and/or frequency exceed specified values. These specified values can be set, and/or manufactured into the properties of the droplet 706, and/or the shunt MEMS switching device 700B.

Figure 7C:
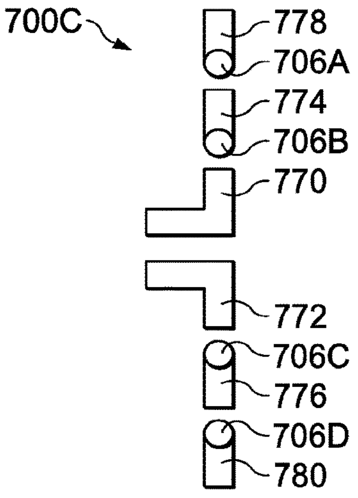
FIG. 7C is an illustration of an operational configuration of a MEMS switching device.

FIG. 7C is an illustration of an operational configuration of a reconfigurable MEMS switching device 700C. The reconfigurable MEMS switching device 700C can include a first droplet 706A, a second droplet 706B, a third droplet 706C, and/or a fourth droplet 706D (collectively droplet(s) 706). The droplet(s) 706 can have metallic properties that allow them to respond to varying levels of voltage, current, and/or frequency. For example, the reconfigurable MEMS switching device 700C can be utilized as a reconfigurable antenna that can be reconfigured based on the frequency and/or voltage utilized for transmission and/or reception. The reconfigurable MEMS switching device 700C, in one example can be set for a high frequency signal with a first electrode 770 and/or a second electrode 772 being utilized as an input and/or output, or for a connection to a transmitter and/or receiver. As the transmission frequency decreases, additional expansion sections, such as a first expansion section 774 of the first electrode 770, a second expansion section 778 of the first electrode 770, a first expansion section 776 of the second electrode 772, and/or a second expansion section 780 of the second electrode 772 can be coupled to the first or second electrodes 770/772 to facilitate the transmission or reception of lower frequencies.

Figure 7E:
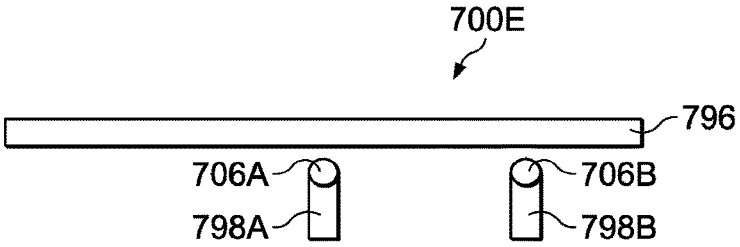
FIG. 7E is an illustration of an operational configuration of a MEMS switching device.
Figure 7D:
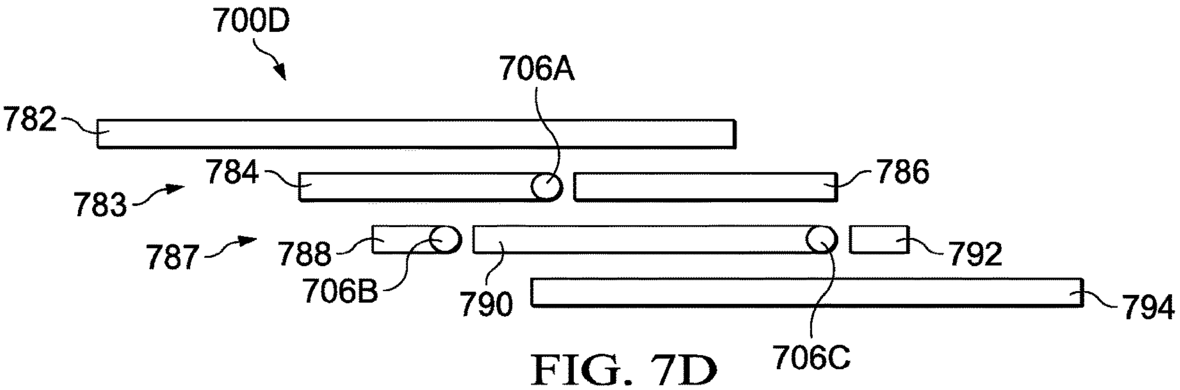
FIG. 7D is an illustration of an operational configuration of a MEMS switching device.

FIG. 7D is an illustration of an operational configuration of a reconfigurable MEMS switching device 700D. The reconfigurable MEMS switching device 700D can also be utilized as a reconfigurable filter. The reconfigurable MEMS switching device 700D can include a first liquid metal droplet 706A, a second liquid metal droplet 706B, and/or a third liquid metal droplet 706C. Additionally, the reconfigurable MEMS switching device 700D may include a first electrode 782, a second electrode 783, a first section 784 of the second electrode 783, a second section 786 of the second electrode 783, a third electrode 787, a first section 788 of the third electrode 787, a second section 790 of the third electrode 787, a third section 792 of the third electrode 787, and/or a fourth electrode 794. The electrodes can be coupled to various inputs and/or outputs, such as a source of voltage or current at any number of frequencies that need filtering based on voltage, current, and/or frequency of the source signal.

For example, an input signal may come from a sound system that has specific speakers emitting different sets of frequencies. Two speakers may be on all the time as they are coupled to first electrode 782, and/or the fourth electrode 794. The second electrode 783 may be split into multiple sections 784/786, that can be coupled together by the first droplet 706A when a specified voltage, current, and/or frequency is achieved allowing the speaker to emitting the corresponding signal for the specified voltage, current, and/or frequency. The third electrode 787, in one example can be coupled to a multi-horn speaker with the first section 788 coupled to a tweeter, the second section coupled to a mid-range speaker 790, and/or the third section 792 coupled to a sub-woofer. The droplets 706B/706C can couple the signal source to the various speaker sections based on the intensity (voltage and/or current) and/or frequency of the signal.

FIG. 7E is an illustration of an operational configuration of a reconfigurable MEMS switching device 700E. Another example of the reconfigurable MEMS switching device 700E allows for the coupling of power factor correction to a circuit, or for load matching of a circuit. For example, an electrode 796 couples to a circuit (not illustrated) that in need of some level of power factor correction, or load matching. The first droplet 706A couples a first load 798A to the electrode 796 based on the specific frequency, voltage, and/or current passed through the electrode 796. A second droplet 706B may couple a second load 798B to the electrode 796 if there is a need for alternative or additional matching and/or correction.

Modifications are possible in the described embodiments, and other embodiments are possible, within the scope of the claims.

What is claimed is:

1. A method of fabricating a switch, comprising:
depositing an oxide layer on a substrate;
patterning a biasing structure on the oxide layer;
growing the oxide layer through the biasing structure;
planarizing the oxide layer to form a planarized surface;
depositing a metal layer on the planarized surface;
selectively depositing a dielectric layer on the metal layer to form a wafer;
dispensing a droplet on the wafer;
providing a dielectric cap; and
bonding the dielectric cap to the wafer to enclose the droplet.

2. The method of claim 1, further comprising applying a voltage to force the droplet to a first side of the metal layer.

3. The method of claim 1, wherein growing the oxide layer includes depositing additional oxide layer materials.

4. The method of claim 1, wherein the metal layer is comprised of a metallic material.

5. The method of claim 1, wherein providing the dielectric cap includes printing the dielectric cap on a frame.

6. The method of claim 1, wherein providing the dielectric cap includes filling the dielectric cap with a fluid.

7. The method of claim 1, wherein the droplet is configurable to flow as a liquid in response to having a voltage applied to the droplet.

8. The method of claim 7, wherein the droplet is configurable to respond to particular voltages.

9. The method of claim 7, wherein the droplet is configurable to respond to particular frequencies.

10. The method of claim 7, wherein the droplet is configurable to return to an original state in response to having the voltage removed from the droplet.

11. The method of claim 1, wherein the biasing structure is a conductive material.

12. The method of claim 1, wherein the oxide layer is grown through a patterned biasing structure from the substrate.

13. The method of claim 2, wherein the droplet is forced to the first side by an attractive force.

14. The method of claim 2, wherein the droplet is forced to the first side by a repulsive force.

15. The method of claim 1, wherein the biasing structure has a high resistivity.

* * * * *